3,523,771
VISUAL DETECTION OF GAS LEAKS
Amos R. Anderson, Adrian, Mich., assignor, by mesne assignments, to American Dynamics International, Incorporated, a corporation of Florida
No Drawing. Filed Sept. 21, 1967, Ser. No. 669,393
Int. Cl. F17d 3/04; G01n 33/22
U.S. Cl. 48—193    7 Claims

ABSTRACT OF THE DISCLOSURE

The invention relates to admixing with fuel gases an indicant agent so that when the gas mixture escapes or leaks into the atmosphere it will produce a visible signal or smoke at the locus where leakage is occurring. The smoke is produced by reaction of the indicant with oxygen or moisture in the atmosphere. The reaction being exothermic produces a heat build-up which is also detectable by infra-red photography. The indicants are selected from the group of normally gaseous or volatile metal alkyls, metal alkyl hydrides, and metal alkyl halides.

Agents suitable for admixing with fuel gases are compounds having the general formula:

$$MR_nX_{3-n}$$

wherein M is aluminum or boron; R is an aliphatic or olefinic straight chain, branched chain or cyclic organic group having 1 to 10 carbon atoms; X is hydrogen or a halogen selected from the group of chlorine, bromine, iodine and fluorine; and $n$ is an integer of at least 1.

Other suitable agents may be compounds having the formula:

$$ZR_nX_{2-n}$$

wherein Z is zinc or cadmium; R is an aliphatic straight chain, branched chain or cyclic organic group having 1 to 10 carbon atoms; X is hydrogen or a halogen from the group of chlorine, bromine, iodine and fluorine; and $n$ is an integer of at least 1.

Specific illustrative agents are triethyl aluminum, ethyl aluminum sesquichloride, diisobutyl aluminum chloride, diisobutyl aluminum hydride, triisobutyl aluminum, aluminum diethyl hydride, diethyl zinc, diethyl cadmium, triethyl borane, etc. which may be added directly to the fuel gases or diluted with compatible hydrocarbon solvents such as butane, hexane, heptane, etc. The agents, singly, or mixtures thereof, may be added to fuel gases in amounts ranging from 0.01 to 10% by weight so that when the admixed fuel gases escape into the atmosphere they produce a visible smoke.

BACKGROUND OF THE INVENTION

This invention relates to visually identifying or detecting gas leaks from a closed receptacle or conduit containing a normally colorless gas. More specifically, the invention relates to adding an agent or indicant to gases which are substantially colorless to the eye but which will be made visible by the presence of the added agent when the admixed gas escapes into the atmosphere.

Field of the invention

The invention has particular application to all types of natural and synthetic fuel gases which may be used for domestic and industrial purposes. For example, an indicant agent may be added to fuel gases, such as natural gas, coal gas, water gas, producer gas, butane, propane, ethylene, propene, butene, and acetylene, so that leakage of such gases may be readily detected in pipe lines or storage receptacles. The leakage of such admixed fuel gases can thus be readily observed at any point in the transmission lines without use of expensive equipment. Such admixed fuel gases can also serve as a safety warning to the lay person or consumer upon escape.

Description of prior art

The article "Detection, Repair, and Prevention of Gas Leaks" published in American Gas Journal, August 1959, pp. 16–28, points out that fuel gas lost through leakage represents a great economic loss today besides potential hazard to public safety. This article contains a survey of ten company practices and refers to 100 literature references. The article refers to the various methods used to detect gas leaks.

In addition, leakage of fuel gas reduces the effective capacity of a distributing system. The detection and location of fuel gas leakage have been previously based on a variety of physical and chemical principles which are costly, require elaborate and expensive equipment and trained technical personnel. The most widely used means is a combustible gas indicator which is based on the controlled aspiration of a sample of the atmosphere to be tested over a hot-wire, catalytic combustion element. The heat of combustion increases the electrical resistance of the wire which is used as a basis for determining the amount of combustible gas present in the sample atmosphere. Infra-red gas detectors have also been used which have to be mounted on trucks or automobiles since considerable equipment is involved. Stethoscopes, sonic leak detectors, mass spectrometers and even trained dogs have been used to detect leaks in fuel gas mains. The addition of strong odoriferous compounds to gas mains has also been utilized so that leaks might be detected by smell. Radioactive gases have also been added to gases to serve as leak detectors requiring special detection instruments and trained personnel.

SUMMARY OF THE INVENTION

The invention provides a simple means for detecting gas leaks by the addition of an indicant agent to the gas. When such admixed gas is stored in tanks or is supplied through gas mains or pipes any leaks which may develop are readily and immediately detected visually by the escaping visible gas without requiring any special equipment of the kind previously in use. Underground or in the dark such leaks can be additionally detected by heat-source infra-red photography. A sufficient amount of the indicant agent is added so that the gas will be visible to the eye upon escape into the atmosphere. It is to be understood that when desired the added indicant may be removed from the gas mixture at the delivery end of the supply line prior to use. The indicant agent may be removed by any known methods such as by adsorption in a suitable medium, by reaction with selected reactants, or by differential diffusion.

As previously stated, the invention is particularly useful for detecting leaks in natural fuel gas pipe line systems at various points in route to the final consumer. The invention also serves as a consumer safety warning agent since the lay person can easily identify any leaks visually by observing the escaping admixed gas.

DESCRIPTION OF PREFERRED EMBODIMENTS

According to this invention selected normally gaseous or volatile metal alkyls, metal alkyl halides, and metal alkyl hydrides are added to fuel gases in amount so that upon escape or leakage of the admixed gas into the normal atmosphere a visible signal or smoke will be produced. These added indicants are preferably substances which are easily volatilized and which can be admixed with the gas and carried along with the gas in a transmission line. If a leak develops the added agent reacts with the oxygen and/or moisture in the air to produce a visible smoke.

Suitable agents are compounds having the general formula:

$$MR_nX_{3-n}$$

wherein M is aluminum or boron; R is an aliphatic or olefinic straight chain, branched chain or cyclic organic group having 1 to 10 carbon atoms; X is hydrogen or a halogen selected from the group of chlorine, bromine, iodine and fluorine; and $n$ is an integer of at least 1.

Specific illustrative agents are triethyl aluminum, ethyl aluminum sesquichloride, diethyl aluminum chloride, ethyl aluminum dichloride, diisobutyl aluminum chloride, monoisobutyl aluminum dichloride, triisobutyl aluminum, aluminum diethyl hydride, methyl aluminum sesquichloride, diisobutyl aluminum hydride, triisohexyl aluminum, tri-n-hexyl aluminum, tri-n-octyl aluminum, tri-n-butyl aluminum, tri-n-decyl aluminum, aluminum isoprenyl, tri-n-propyl aluminum, triisopropyl aluminum, tri-n-butyl aluminum, and tricyclohexyl aluminum. Boron compounds analogous to the aforementioned aluminum compounds may be used such as boron triethyl, boron diethyl bromide, etc.

Other suitable agents may be compounds having the formula:

$$ZR_nX_{2-n}$$

wherein Z is zinc or cadmium; R is an aliphatic straight chain, branched chain or cyclic organic group having 1 to 10 carbon atoms; X is hydrogen or a halogen from the group of chlorine, bromine, iodine and fluorine; and $n$ is an integer of at least 1.

Illustrative specific compounds are diethyl zinc, di-n-butyl zinc, diethyl cadmium, diisobutyl cadmium, dioctyl zinc, and dicyclohexyl zinc.

These agents may be added to fuel gases in concentrations ranging from about 0.01 to about 10% by weight in the fuel gases. They may also be conveniently added in solutions of suitable hydrocarbons, such as butane, hexane, heptane, etc. When the admixed fuel gases escape into the atmosphere they produce a visible smoke. Also when the admixed gases escape into the atmosphere the indicant agents react exothermally with the oxygen in the atmosphere to develop heat underground or in the dark atmosphere which can be detected by infra-red photography. When the admixed gases are burned they produce luminous or colored flames, depending upon the specific indicants used. For example, boron alkyls give a green flame; zinc alkyls give a green to blue flame; aluminum alkyls give a luminous flame. A mixture of 85% triethyl borane and 15% diethyl zinc has been found suitable for admixture with fuel gases in amounts 0.05 to 25%. The addition of 25% by weight triethyl aluminum containing a trace of diethyl zinc in hydrocarbon solution is useful for detecting fuel leaks. The use of excessive amounts of diethyl zinc may cause plugging of burner orifices and deposition of zinc oxide. However, orifice plugging could be overcome by passing the admixed fuel gas through a suitable wash filter installed prior to the burner.

It is apparent that other specific indicants having the properties previously described may be readily selected in the light of the teaching of this invention for admixing with fuel gases. These are intended to be included within the scope of the appended claims.

I claim:
1. The process of detecting gas leaks from a conduit through which fuel gas is flowing which comprises the steps of admixing an indicant agent with a fuel gas, said indicant agent being a normally gaseous or volatile compound selected from the group consisting of compounds having the formula:

$$MR_nX_{3-n}$$

wherein M is aluminum or boron; R is an aliphatic or olefinic straight chain, branched chain or cyclic organic group having 1 to 10 carbon atoms; X is selected from the group consisting of hydrogen, chlorine, bromine, iodine and fluorine; and $n$ is an integer of at least 1 and not more than 3; and compounds having the formula:

$$ZR_nX_{2-n}$$

wherein Z is zinc or cadmium; R is an aliphatic straight chain, branched chain or cyclic organic grouping having 1 to 10 carbon atoms; X is selected from the group consisting of hydrogen, chlorine, bromine, iodine and fluorine; and $n$ is an integer of at least 1 and not more than 2, and transmitting said admixed gas through a conduit, said indicant agent being present in said fuel gas in unreacted amount to be visible when said admixed gas escapes or leaks into the atmosphere and reacts with same.

2. The process of detecting fuel gas leaks from a container which comprises the step of admixing an indicant agent with a fuel gas, said indicant agent being normally gaseous or volatile compounds selected from the group consisting of a compound having the formula:

$$MR_nX_{3-n}$$

wherein M is aluminum or boron; R is an aliphatic or olefinic straight chain, branched chain or cyclic organic group having 1 to 10 carbon atoms; X is selected from the group consisting of hydrogen, chlorine, bromine, iodine and fluorine; and $n$ is an integer of at least 1 and not more than 3; and a compound having the formula:

$$ZR_nX_{2-n}$$

wherein Z is zinc or cadmium; R is an aliphatic straight chain, branched chain or cyclic organic group having 1 to 10 carbon atoms; X is selected from the group consisting of hydrogen, chlorine, bromine, iodine and fluorine; and $n$ is an integer of at least 1 and not more than 2, and storing said admixed gas in a container, said indicant agent being present in said fuel gas in unreacted amount to be visible when said admixed gas escapes or leaks into the air and reacts with same.

3. The process of claim 1, wherein the fuel gas is selected from the group consisting of natural gas, coal gas, water gas, producer gas, butane, propane, ethylene, propene, butene and acetylene.

4. The process of claim 1, wherein the indicant agent comprises volatilized triethyl aluminum.

5. The process of claim 1, wherein the indicant agent comprises volatilized triethyl borane.

6. The process of claim 1, wherein the indicant agent comprises volatilized diethyl zinc.

7. The process of claim 1, wherein the indicant agent comprises volatilized ethyl aluminum sesquichloride.

References Cited

UNITED STATES PATENTS

| | | | |
|---|---|---|---|
| 3,118,864 | 1/1964 | Robinson et al. | |
| 3,256,307 | 6/1966 | Mangham | 260—448 |
| 3,352,894 | 11/1967 | Crain et al. | 260—448 |
| 3,375,235 | 3/1968 | D'Alelio | 260—448 X |
| 3,388,142 | 6/1968 | Cameron et al. | 260—448 |

JOSEPH SCOVRONEK, Primary Examiner

U.S. Cl. X.R.

23—232; 48—195, 196, 197; 73—40.7; 116—114; 252—408